United States Patent [19]

Bucci et al.

[11] Patent Number: 5,592,963

[45] Date of Patent: Jan. 14, 1997

[54] CONTROL VALVE AND SYSTEM FOR FUEL VAPOR RECOVERY

[75] Inventors: George H. Bucci, South Windsor; Mark R. Johansen, Cheshire, both of Conn.

[73] Assignee: Walbro Corporation, Cass City, Mich.

[21] Appl. No.: 539,197

[22] Filed: Oct. 4, 1995

[51] Int. Cl.$^6$ ........................................... F16K 3/18
[52] U.S. Cl. ............................... 137/202; 137/43
[58] Field of Search ........................... 137/43, 202

[56] References Cited

U.S. PATENT DOCUMENTS

| | | | |
|---|---|---|---|
| 2,860,656 | 11/1958 | Eshbaugh | 137/202 |
| 3,549,119 | 12/1970 | Sellers | 251/129 |
| 3,910,302 | 10/1975 | Sudhir | 137/43 |
| 4,381,928 | 5/1983 | Roffelsen | 137/202 X |
| 4,753,262 | 6/1988 | Bergsma | 137/39 |
| 5,062,444 | 11/1991 | Bergsma | 137/202 |
| 5,313,977 | 5/1924 | Bergsma et al. | 137/43 |
| 5,449,029 | 9/1995 | Harris | 137/202 X |

*Primary Examiner*—Gerald A. Michalsky
*Attorney, Agent, or Firm*—Barnes, Kisselle, Raisch, Choate, Whittemore & Hulbert

[57] ABSTRACT

A vehicle on board system for recovering fuel vapors from the fuel tank both during filling of the fuel tank with volatile hydrocarbon liquid fuel and operation of the vehicle engine. A control unit in the fuel tank has a valve assembly actuated by a float to control the flow of fuel vapors from the top of the tank into a receiving canister with activated charcoal for absorbing the fuel vapors which can be purged from the canister by operation of the engine. The valve assembly has a valve seat, a flexible elastomeric closure received on a pivotally mounted carrier plate movable to open and closed positions relative to the seat, and a stripper plate encompassing the seat, overlying the closure and pivotally movable by the float to disengage the closure from the seat to open the valve. Preferably, pads on the stripper plate bear on only a portion of the flexible closure during initial opening of the valve to thereby decrease the force required to initially open the valve and increase the sensitivity and responseness of the valve assembly. Preferably, to substantially prevent any liquid fuel from passing through the valve assembly while it is open, a depending tube encircles the valve assembly and the float is slidably received in the tube with a relatively close fit to prevent fuel sloshing in the tank which enters the tube from being forced past the float and into the open valve assemby.

24 Claims, 4 Drawing Sheets

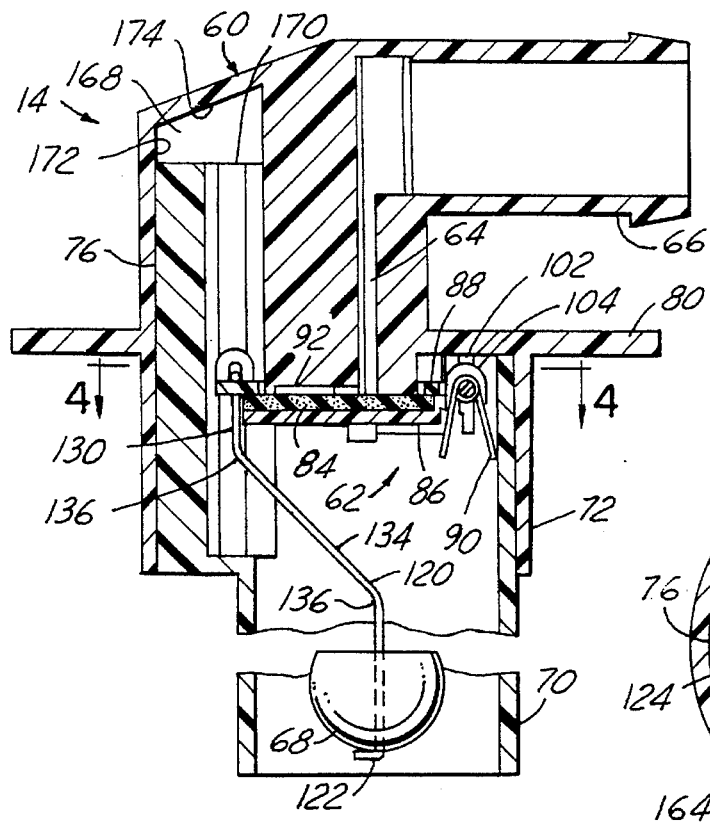

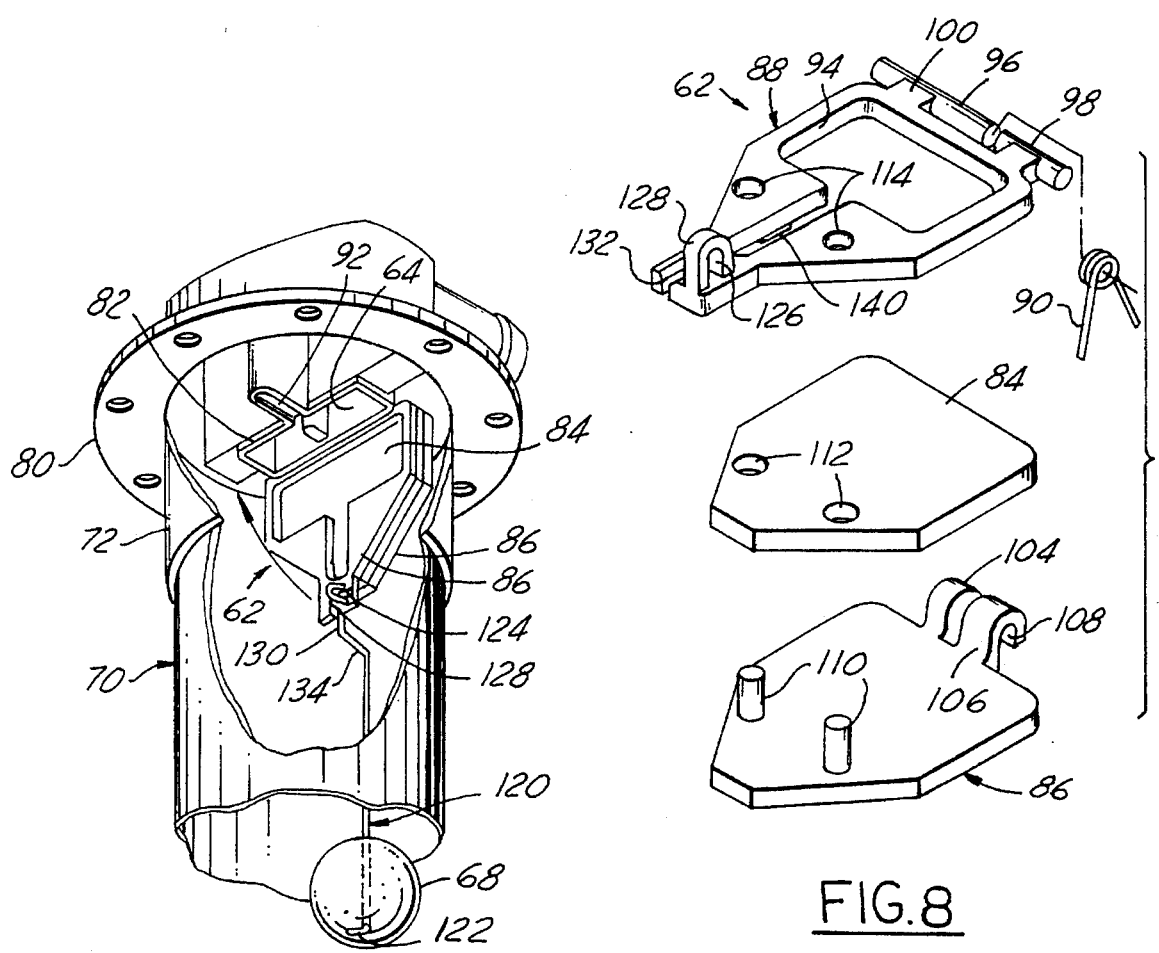
FIG.7
FIG.8
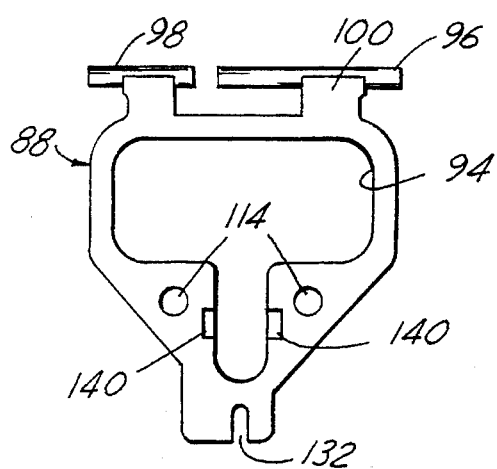
FIG.9
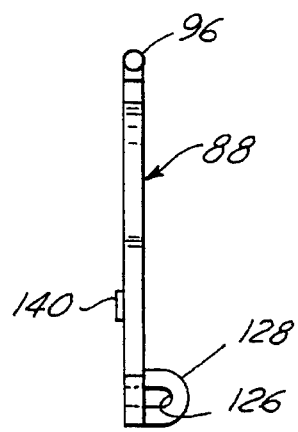
FIG.10

5,592,963

CONTROL VALVE AND SYSTEM FOR FUEL VAPOR RECOVERY

FIELD OF THE INVENTION

This invention relates to vehicle fuel tanks and more particularly to devices for prevention of the escape of fuel vapor to the atmosphere.

BACKGROUND OF THE INVENTION

As concern for protection of the environment increases, regulations for preventing the escape to the atmosphere of volatile hydrocarbon fuel vapors are being promulgated by governmental agencies. One source of these hydrocarbon vapors is the fuel tanks of vehicles using gasoline or other hydrocarbon fuels of high volatility. With present automotive gas tank designs, fuel vapor can escape during the filling of tanks, and usually even after the fuel tank is filled. Furthermore, the person filling the tank with fuel from a gasoline pump can "overfill" the tank which significantly increases the escape of fuel vapor and often produces spit-back of liquid fuel which rapidly releases hydrocarbon vapor into the atmosphere.

The fuel dispensing nozzle of a typical station fuel pump has an automatic shut-off which is actuated by liquid fuel rising sufficiently in the fill tube of the fuel tank to at least momentarily cover and close off a control port immediately adjacent the outlet end of the dispensing nozzle. Closing this control port causes a vacuum actuated diaphragm and valve to automatically shut off the discharge of liquid fuel from the dispensing nozzle. With a typical prior vehicle fuel tank, this automatic shut off occurs when the fuel tank has been fully filled to the fuel level desired to provide a vapor dome in the tank above the liquid fuel having a predetermined desired minimum volume. However, by again manually actuating the fuel dispensing nozzle sufficient additional liquid fuel can be forced into the tank to create an overfilled condition which undesirably decreases or even eliminates the vapor dome in the tank, leaves liquid fuel in the tank fill pipe, produces substantial spit back of liquid fuel and sometimes discharges excess liquid fuel to the atmosphere through the open tank fill pipe and/or a tank vent.

SUMMARY OF THE INVENTION

A control unit which substantially eliminates spit-back and overfilling with fuel of a vehicle fuel tank and controls the collection and recovery of hydrocarbon fuel vapor during filling of the tank and subsequent operation of the vehicle. A carbon canister receives fuel vapors through the control unit which is mounted in the top of the fuel tank. The canister communicates with the intake manifold of the vehicle engine for exhausting fuel vapor from the canister during operation of the engine. The control unit has a valve with a variable orifice and flow rate responsive to the level of fuel in the tank to fully open at a sufficiently low fuel level to permit fuel vapors to freely flow from the tank into the canister, as the fuel level rises during filling to approach the desired maximum level of fuel to gradually and continuously move toward its fully closed position to restrict vapor flow and thereby cause actuation of the automatic shut-off of the fuel pump dispensing nozzle, and, if further filling is attempted, to continue to move to its fully closed position and cause actuation of the automatic shut-off of the fuel pump dispensing nozzle. This prevents significant actual further "over filling" of the tank and maintains the desired minimum volume of the vapor dome or space in the top of the "filled" fuel tank.

Preferably the valve has a seat and a pivotally mounted closure actuated by a float and providing a variable flow rate orifice and closure. Preferably the float opens the valve through a pivoted stripper plate which applies a force primarily to only a portion of a flexible valve closure to decrease the force required to initially open the valve and hence increases its sensitivity and responsiveness. Preferably, regardless of the fuel level, this valve also fully closes in the event of a roll-over accident to prevent liquid fuel and vapor from being discharged from the tank.

Preferably, to insure that essentially no liquid fuel passes through the open valve and into the carbon canister during normal operation of the vehicle, the float is slidably received with a relatively close fit in a depending tube opening at its lower end into the tank and adjacent its upper end encircling the valve and preferably a separate vapor passage communicates with the valve. Preferably, the vapor passage extends generally vertically above the valve and preferably above the top of the tank and communicates with the interior of the tank at a point below the valve and above the bottom of the tube.

Objects, features and advantages of this invention include a control unit for a fuel tank and vapor handling system which collects the refueling fuel vapors, routes fuel vapor to a canister receptor, prevents the escape of fuel vapor as the tank is filled, is actuated by the level of fuel in the tank, provides timely actuation of the automatic shut-off of a fuel dispensing nozzle as the tank reaches its desired filled fuel level, prevents fuel spit-back during filling, prevents the canister from receiving liquid fuel, closes in a vehicle roll-over condition, maintains a fuel tank gas vapor dome under attempted overfilling conditions, is sensitive and responsive to changes in fuel level and is rugged, durable, reliable, and of relatively simple design, economical manufacture and assembly, and has a long useful life in service.

BRIEF DESCRIPTION OF THE DRAWINGS

These and other objects, features and advantages of this invention will be apparent from the following detailed description of the preferred embodiment and the best mode presently contemplated for this invention, appended claims and accompanying drawings in which:

FIG. 3 is a fragmentary sectional view of the control valve unit taken on line 3—3 of FIG. 2 with the valve assembly in its fully closed position;

FIG. 4 is a sectional view of the control valve unit taken generally on line 4—4 of FIG. 3;

FIG. 5 is a fragmentary sectional view of the control valve unit taken on line 5—5 of FIG. 2;

FIG. 6 is a fragmentary sectional view illustrating the initial opening of the valve assembly of the control unit;

FIG. 7 is a perspective view with portions broken away of the control valve unit of FIG. 2 with the valve assembly in its fully open position;

FIG. 8 is an exploded perspective view of some of the components of the valve assembly of the control unit of FIG. 2;

FIG. 9 is a bottom view of the stripper plate of the valve assembly;

FIG. 10 is a side view of the stripper plate;

DETAILED DESCRIPTION

Figure 1:
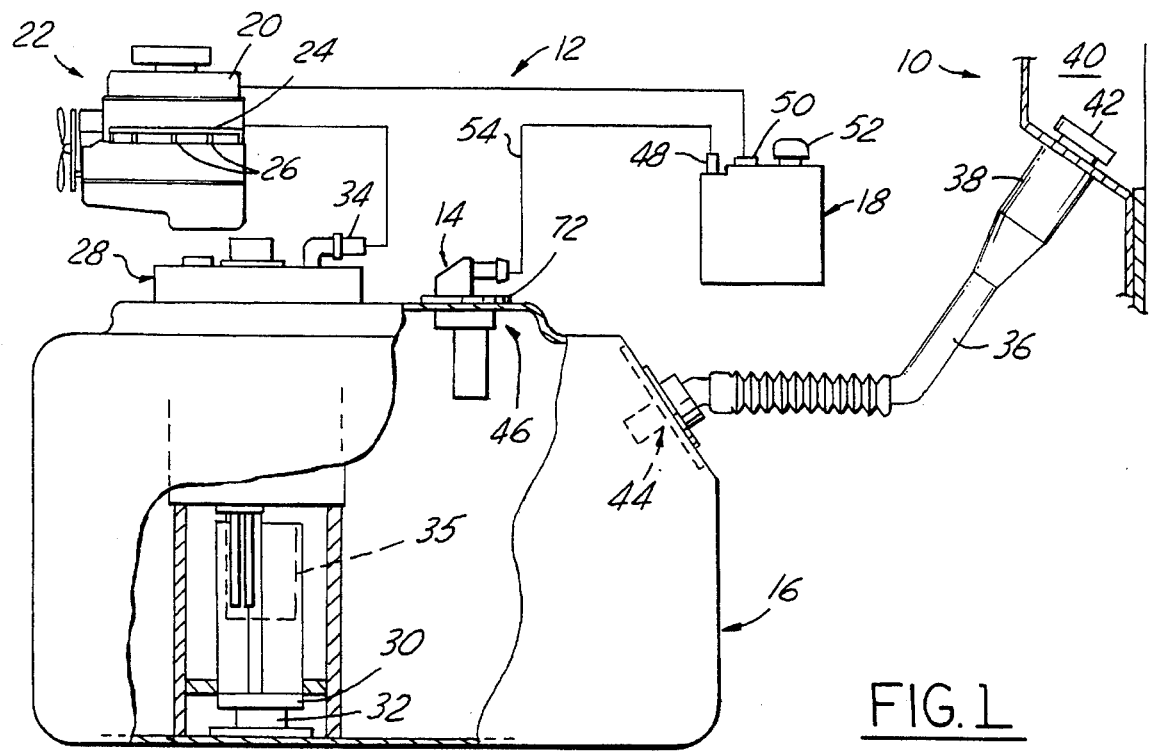
FIG. 1 is a semi-diagrammatic view of a vehicle fuel system with a fuel tank having a fill pipe, fuel pump module, vapor recovery canister, and a control valve unit embodying this invention.
Figure 2:
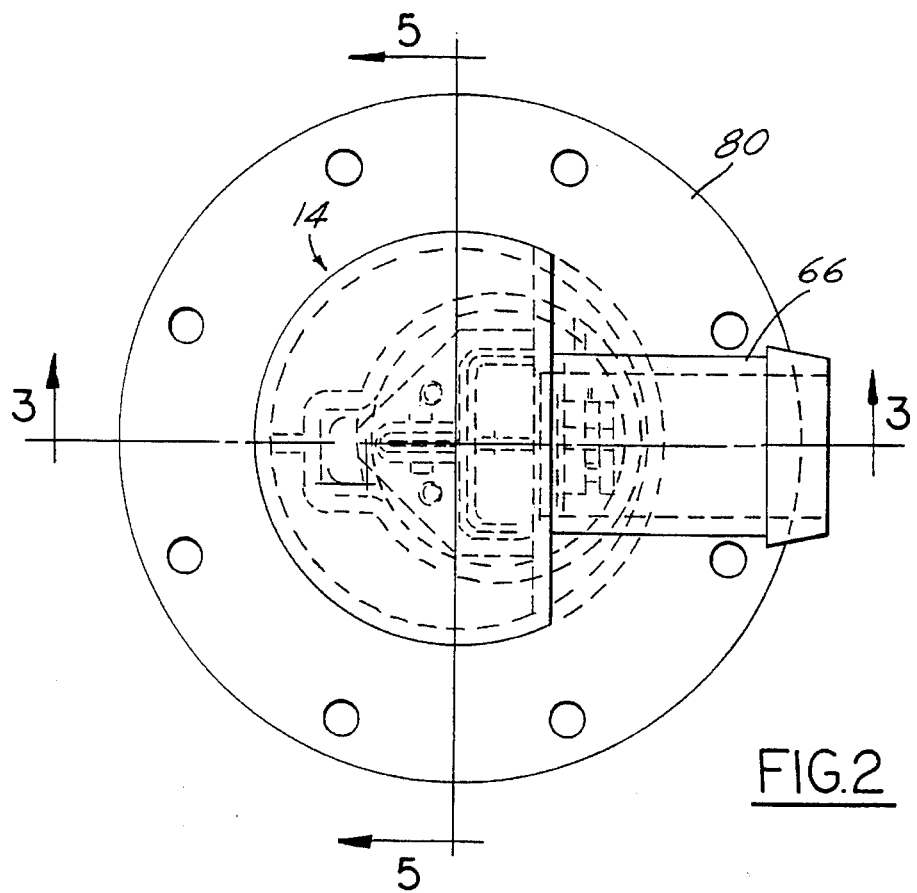
FIG. 2 is a top view of the control valve unit of FIG. 1 of this invention.
Figure 11:
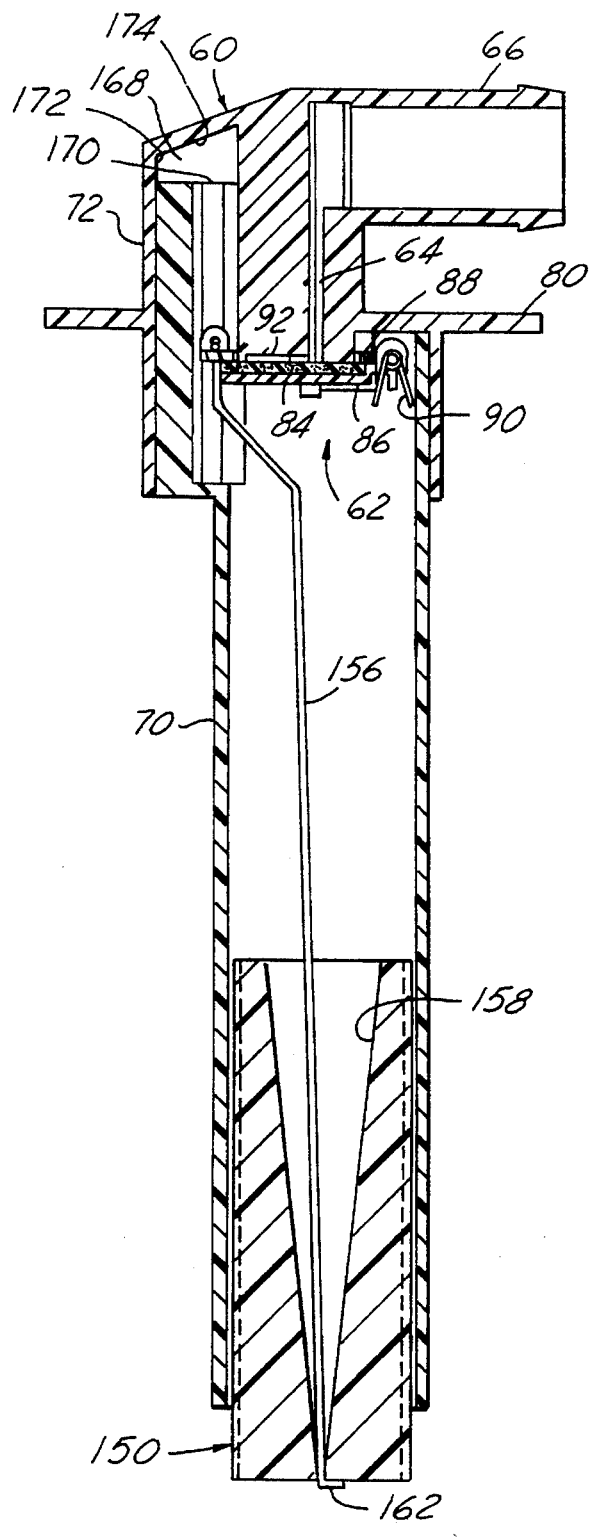
FIG. 11 is a sectional view of the control valve unit with modified float and baffle tube assembly.
Figure 13:
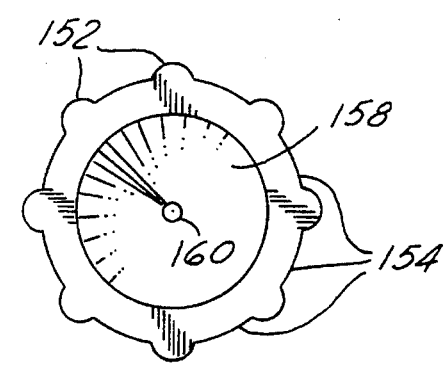
FIG. 13 is an enlarged top view of the float of FIG. 12.

FIG. 1 diagrammatically illustrates an automotive vehicle 10 with an on-board vapor recovery system 12 having a control valve unit 14 embodying this invention. The control unit 14 is mounted on the top of a fuel tank 16 and connected to a fuel vapor storage canister 18 which is connected to the intake manifold 20 of an internal combustion engine 22. Typically, liquid fuel is supplied to a fuel rail 24 and fuel injectors 26 of the engine by a fuel delivery module 28 in the tank which has a fuel pump 30 with a fuel inlet 32 adjacent the bottom of the tank and a fuel outlet 34 accessible from the exterior of the tank. The pump 30 is driven by an electric motor 35. The tank 16 is filled with liquid fuel through a fill pipe or tube 36 with an inlet 38 disposed vertically above the top of the tank and received in an access pocket 40 of the vehicle. The inlet 38 is closed-and sealed by a removable gas cap 42. To prevent reverse flow of fuel from the tank through the fill pipe, preferably a check valve 44 is located at the lower end of the fuel pipe. Preferably, a raised area in the top wall of the tank provides a well defined vapor dome 46.

The check valve 44 may be of the ball, flapper, disc, duckbill or other type of suitable check valve permitting the free and rapid flow of fuel through the fill pipe and into the tank, and preventing reverse flow of fuel in the tank through the fill pipe. A presently preferred flexible disc-type check valve is disclosed in U.S. patent application Ser. No. 08/428, 340, filed on Apr. 25, 1995, the disclosure of which is incorporated herein by reference and hence the check valve 44 will not be described in further detail.

Typically, the canister 18 is filled with activated charcoal (preferably grade 15) to absorb the hydrocarbon vapors received from the control valve unit 14 through an inlet port 48 and to discharge the vapor through an outlet or purge port 50 into the intake manifold 20 of the engine. The interior of the canister is vented to the atmosphere through a port 52 in the top of the canister. In some applications, a check valve prevents reverse flow of the fuel vapor through the port 52 to the atmosphere. The canister is mounted in the vehicle and is connected to the control valve unit 14 and the intake manifold 20 by suitable flexible hoses 54 and 56.

As shown in FIGS. 2–5, the control valve unit 14 has a housing 60 with a valve assembly 62 which controls the flow of fuel vapor from the tank 16 to the canister 18. When the valve assembly is open fuel vapor can flow through an outlet passage 64 in the housing and a hose connector elbow 66 to the canister. The valve assembly has a float 68 encircled by a baffle tube 70 the upper end of which is press fit or otherwise secured in a depending integral skirt 72 of the housing. As shown in FIGS. 3 and 5, the upper portion 74 of the baffle tube surrounds the valve assembly 62 with the major portion of its side wall spaced from the housing skirt 72 and in cooperation therewith defines a baffle which shields the valve assembly 62 from being contacted or splashed with liquid fuel when liquid fuel sloshes around in the fuel tank during normal operating conditions of the vehicle. This labyrinthine baffle arrangement permits fuel vapor to communicate with the valve assembly 62 and when open the outlet passage 64 while preventing liquid fuel from splashing onto the valve assembly and passing into the outlet passage 64. As shown in FIGS. 3 and 4, preferably, the upper portion 74 of the baffle tube has an interference fit with housing skirt 72 along a projecting rib 76 and the arcuate portion 78 of the upper wall. The housing has an integral flange 80 which in assembly is mounted on and sealed to the top of the fuel tank.

As shown in FIGS. 3, 4, 7 and 8, the valve assembly 62 has a valve seat 82 encircling the outlet passage 64, a cooperating elastomeric valve closure 84 received on a carrier plate 86 mounted for pivotal movement by a stripper plate 88 actuated by the float 68 and yieldably biased toward their closed position by a spring 90. To reduce the force required to initially slightly open the valve and to provide a flow rate through the valve which varies significantly depending on the extent of the initial opening of the valve, the seat 82 has a generally T-shaped configuration with a central body portion having a recess 92 within the seat which extends from and has relatively little area compared to the cross sectional area of the outlet passage 64 bounded by the head portion of the T-shaped seat. Preferably, the recess 92 is elongate and extends axially generally perpendicular to the axis about which the closure 84 and carrier plate 86 pivot as the valve opens and closes. The stripper plate 88 has a T-shaped clearance opening 94 which in assembly is received around the raised seat 82 and a pair of integral and coaxial pivot shafts 96 and 98 fixed to tabs 100. In assembly the outer ends of the shafts 96 and 98 are received and journalled for rotation in blind slots 102 in the upper end of the baffle tube 70. This mounts the stripper plate 88 so that it can pivotally move between the fully closed position shown in FIG. 3 and the fully open position shown in FIG. 7.

Other shapes of the seat 82 will work. Preferably the seat has a non-circular shape-with an area which varies and goes from smaller at a point distal from the pivot axis of the closure to larger adjacent the pivot axis of the closure.

In assembly, the carrier plate 86 is journalled for pivotal movement by a pair of spaced apart integral fingers 104 and 106 with return bend portions 108 received between the stripper plate tabs 100 and journalled on the pins 96 and 98. In assembly, the elastomeric closure 84 is received between the stripper plate 88 and the carrier plate 86 and located on the carrier plate by a pair of integral pins 110 projecting through complimentary holes 112 in the closure 84 and into oversized clearance holes 114 in the stripper plate. The thickness of the stripper plate 88 is less than the vertical projection of the valve seat 82 so that when the valve is fully closed as shown in FIG. 3, the end face of the seat 82 projects through the stripper plate 88 and into firm sealing engagement with the elastomeric closure 84. Preferably, the closure 84 is made of a relatively soft and flexible elastomeric material with a high resistance to deterioration in use by contact with hydrocarbon fuel and fuel vapors such as a fluoro-silicone rubber having a durometer desirably in the range of about 15–70, desirably about 20–65, and preferably about 40–60 on the Shore A scale.

The float 68 is slidably received on the lower portion of a rigid wire 120 and retained thereon by a right angle bent portion 122 at its lower end. The other end of the wire 120 is pivotally connected to the free end of the stripper plate 88 by a right angle bent portion 124 pivotally received in a bore or opening 126 formed by an integral loop or tab 128 adjacent the free end of the stripper plate 88. In assembly, the bent portion 124 is retained in the tab 128 by the adjacent shank portion 130 of the wire being slidably received in a blind slot 132 through the free end of the stripper plate 88. To align the float 68 in the tube 70 and provide clearance for the wire 120, it has an offset intermediate portion 134 formed by bends 136.

Typically, the float 68 has a specific gravity which is greater than that of the liquid fuel with which the control unit is utilized and is preferably made of a non-porous plastic material which is highly resistant to degradation by contact with hydrocarbon fuel such as a high density polypropylene polymer having a density of about 1.0 gram per cubic centimeter. Usually, the fuel has a specific gravity of about 0.6 to 0.8 and the float has a specific gravity of about 0.9 to 1.4 and preferably about 1.0.

In the event of a vehicle rollover in which the control unit 14 is turned upside down the valve assembly 62, is maintained in its fully closed position by the forces produced by the spring 90, gravity acting on the float 68, and the head of any liquid fuel overlying the valve assembly 62 and acting on the carrier plate 86 and hence the closure seal 84 to urge it into firm sealing engagement with the seat 82. The sum of these forces must exceed the opposing force produced by the bouyancy of the float when submerged in liquid fuel.

Of course, when the unit 14 is in its normal upright position, as shown in FIG. 3, the force produced by the spring 90 must be less than the force of gravity acting on the float 68 and the valve assembly 62 when they are not immersed in any fuel so that the valve assembly 62 will be in its fully open position as shown in FIG. 7. When the unit is in its normal upright position, the force produced by the spring 90 must also be sufficient so that when the float is immersed in liquid fuel the spring will move the valve assembly 62 to its fully closed position as shown in FIG. 3. If this rollover valve closer feature is not required, if desired the spring could be eliminated by utilizing a float 68 fixed to the wire 120 and having a specific gravity less than that of the fuel to close the valve when the float is at least partially immersed in liquid fuel with the vehicle in its normal upright operating attitude.

Preferably to reduce the force required to initially slightly open the fully closed valve assembly 62, as shown in FIGS. 9 and 10, the stripper plate 88 has a pair of raised protuberances or pads 140 which when the valve is fully closed bear on the underlying seal element 84 outside of and immediately adjacent the relieved area 92 of the valve seat 82. When a valve opening force is initially applied by the float 68 acting on the stripper plate, these pads 140 apply a force primarily to only the area of the resilient closure 84 immediately adjacent the relieved area 92 of the opening which causes this area to be the first portion of the closure 84 to disengage from the seat 82 to thereby initially open slightly the valve assembly. This initial slight opening of the valve assembly 62 relieves any differential pressure acting on the entire valve assembly due to superatmospheric vapor pressure within the tank and thereby decreases the magnitude of the force required to open the valve. The effect of the force applied by the pads 140 to the closure 84 is also increased by the lever arm produced by the pivotally mounted stripper plate 88.

Figure 12:
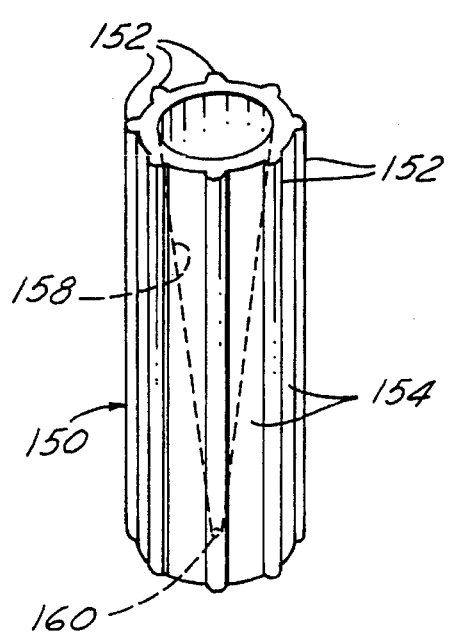
FIG. 12 is a perspective view of the float of the modified assembly of FIG. 11.

FIG. 12 illustrates the air control valve unit 14 with a modified float 150 slidably received in the baffle tube 70 to further insure that no liquid fuel passes through the open valve 62 to the canister 18 when the vehicle 10 is operating in its normal upright attitude which causes liquid fuel to slosh around in a partially filled fuel tank 16. To prevent liquid fuel which enters the bottom of the tube 70 from being forced past the float 150, it has a relatively close fit with the inside diameter of the tube wall while still being readily slidably movable therein. Preferably, to minimize any sliding friction between the float 150 and the baffle tube 70, the float has a plurality of circumferentially spaced ribs 152 (FIG. 12) which, in assembly, lie closely adjacent to the wall of the tube and between them longitudinally extending slightly recessed areas 154. Preferably, to further minimize the likelihood of any liquid fuel being forced past the upper end of the float, it has an axial length, which is at least twice its outside diameter, and preferably two to three times its outside diameter. To provide clearance between the float and the rigid wire 156 connecting it to the valve assembly 62, preferably the float has a conical recess 158 extending axially of the float with its major diameter adjacent the top and its minor diameter adjacent the bottom of the float. Preferably, the connecting wire 156 passes through a relatively close fitting and short cylindrical passage 160 at the bottom of the float. Preferably, the float is slidably received on the wire and is retained by a bent portion 162.

Preferably, one or more separate passages 164 (FIGS. 3–5 & 12) are provided for the flow of fuel vapor and the other gases from the interior of the tank 16 to the valve assembly 62. Passages 164 are defined by the cooperation of the upper portion 74 of the tube 70 with the housing 60 and its depending skirt 72. Preferably, the inlet 166 of the passages communicates with the fuel tank at a point generally vertically below the valve seat 82 and above the open end of the bottom of the tube 70. Preferably, the passages 164 communicate with the valve assembly 62 through a sinuous or labyrinthine flow path having an uppermost portion 168 which is generally vertically above the valve seat and the top of the tank 16. This vertically uppermost portion 168 of the flow path is defined by the cooperation of the upper end 170 of the upper portion 74 of the tube 70 and the adjacent sidewall 172 and the top 174 of the housing 60. The cooperation of the float 150 with the tube 70 and of this construction and arrangement of the vapor flow passages 164 substantially eliminates the passage of any liquid fuel through the open valve assembly 62. Even when liquid fuel is rapidly and violently sloshing around in the fuel tank 16, this float, tube and fuel vapor flow path arrangement permits the valve assembly to rapidly close before any substantial amount of liquid fuel passes through it.

Preferably, the float is made of a non-porous and dense plastic material, which is highly resistant to degradation by contact with hydrocarbon fuels, such as a high density polypropylene polymer and has a specific gravity greater than that of the liquid fuel with which the control unit is utilized. Preferably, this specific gravity of the float 150 is in the same ranges as that previously stated for the float 68.

Operation

Typically, to fill an at least partially empty vehicle tank 16 with a liquid fuel, such as gasoline or diesel fuel oil, the filler cap 42 is removed, a dispensing nozzle with an automatic shut-off of a station fuel pump is inserted into the inlet 38 of the fill pipe and the nozzle valve is manually opened to discharge liquid fuel through the fill pipe 36, check valve 44, and into the tank 16, usually at a pressure of about 25 to 30 inches of water and a flow rate of 10 to 12 gallons per minute. The fuel flowing into the tank produces a superatmospheric pressure in the tank which forces fuel vapor through the control unit 14 (and its open valve assembly 62, passage 64 and outlet coupling 66) and into the canister 18. So long as the float 68 is not in any liquid fuel, its weight overcomes the force of the spring 90 and the valve assembly 62 remains fully open as shown in FIG. 7.

During filling, as the level of liquid fuel in the tank rises sufficiently so that the float 68 or 150 becomes at least partially submerged in fuel and begins to move upward, the bias of the spring 90, begins to move the valve assembly 62 toward its closed position. As this fuel level continues to rise, the valve assembly 62 continues to move progressively toward its fully closed position until fully closed. As shown in FIG. 3, in its fully closed position the resilient closure 84 is in sealing engagement with the seat 82. This stops the flow of fuel vapor through the outlet 64, 66.

As the valve assembly 62 becomes partially closed it substantially restricts the flow of fuel vapor sufficiently to increase the pressure within the tank and cause liquid fuel to rise in the filler pipe 36 and actuate the automatic shut-off of the fuel dispensing nozzle of the station pump. The automatic shut-off mechanism of the nozzle has a small control or aspirator port adjacent the nozzle outlet which when closed by liquid fuel in the fill pipe causes its diaphragm mechanism to "automatically" shut-off the discharge of fuel from the dispensing nozzle.

This is believed to provide a "softer" or somewhat slower rise of fuel in the filler pipe to actuate the automatic shut-off of the dispensing nozzle without "spit-back" or discharge of liquid fuel from the inlet of the filler pipe to the atmosphere. Regardless of any theoretical explanation the control unit 14 produces substantially no fuel spit-back while still timely actuating the automatic shut-off of the dispensing nozzle.

If the fuel dispensing nozzle is again manually actuated or opened to "overfill" the tank, the additional fuel causes further progressive closure of the valve assembly 62 and the fuel level to rise more rapidly in the fill tube 36 and again actuate the automatic shut-off of the dispensing nozzle and thereby prevent the tank from being overfilled to the extent that it decreases the volume of the vapor dome 46 below a predetermined desired minimum volume. This also circumvents further efforts to overfill the tank by repeatedly manually actuating the dispensing nozzle by temporarily retaining liquid fuel in the fill tube which actuates the automatic shut-off of the dispensing nozzle. Repeated sufficient attempts to "overfill" the tank will completely close the valve assembly 62. After filling of the tank is completed, the dispensing nozzle is removed and the cap 42 is reinstalled to close the inlet 38 of the fill pipe.

When and while the float 68 or 150 causes the valve assembly 62 to remain closed, the closed valve assembly also prevents liquid fuel from being forced from the tank through the outlet 64, 66 and into the carbon canister 18 thereby protecting the carbon canister from being saturated with liquid fuel which would be discharged to the atmosphere.

After the tank is filled and the vehicle is operated, eventually sufficient fuel will be consumed from the tank 16 so that the fuel level drops sufficiently that the weight of the float 68 or 150 acting on the wire 120 produces enough force to open the valve assembly 62. The force produced by the float is applied through the wire 120 to the stripper plate 88 which through the pads 140 initially applies a force to the resilient closure 84 primarily only in the area adjacent the pads 140 and hence the elongate recess 92 of the outlet 64 so that the closure 84 initially opens or disengages from the seat 82 only adjacent this recess 92. This reduces the force required to initially open the closure 84 by initially "peeling away" only a portion of it from the seat 82. If just prior to initial opening of the valve, the pressure in the tank is superatmospheric, which increases the closing forces acting on the closure 84, this peel away initial opening relieves this superatmospheric pressure as well as reduces the opening force required to overcome this superatmospheric pressure closing force by greatly reducing the area of the closure 84 being initially opened. This will also break any hydrostatic seal at the seat 82 and readily peel away and release the closure 84 as the stripper plate 88 pivots away from the seat 82 as the float 68 descends.

When the valve assembly 62 is open and the engine is operating, vapor will be removed from the canister 18 and drawn through the port 50 and conduit 56 into the intake manifold 20 of the engine where the fuel vapor will be mixed with intake air and supplied to the cylinders of the operating engine. This may also produce a sufficient vacuum or a sufficiently subatmospheric pressure in the canister 18 that fuel vapor in the fuel tank will flow through the open outlet 64, 66 of the control unit 14 and into the canister, particularly if the atmospheric vent 52 of the canister contains a check valve or a solenoid valve which prevents or restricts reverse flow of atmospheric air through the passage 52 into the canister.

Typically, when the engine is shut-off and the valve assembly 62 is completely open, fuel vapor will flow from the tank through the control unit 14 and into the canister when the pressure in the tank is greater than atmospheric pressure by as little as about one inch to three inches of water pressure or about 0.004 to 0.1 pounds per inch square. Thus, the canister 18 and the control unit 14 provide negligible resistance to the flow of fuel vapor from the tank whenever the valve assembly 60 of the control unit is open.

What is claimed is:

1. A vapor control apparatus for a vehicle fuel tank for containing volatile hydrocarbon liquid fuel which comprises: a housing constructed to be received in a vehicle fuel tank adjacent the top of the tank, an outlet passage carried by the housing for communicating with the exterior of the tank for supplying fuel vapor from the interior of the tank to a vapor receiving canister, a valve seat carried by the housing immediately adjacent the top of the tank, and having a continuous perimeter bounding a valve opening communicating with the outlet passage for supplying to the outlet passage fuel vapor from the interior of the tank, a carrier plate pivotally carried by the housing and movable to a closed position underlying the valve seat and to an open position spaced from the closed position, a flexible closure of an elastomeric material received on the carrier plate and in the closed position bearing on the seat to prevent the flow of fuel vapor from the tank through the valve opening into the outlet conduit and in the open position disengaged from the seat to permit the flow of fuel vapor from the tank through the valve opening and outlet, a stripper plate pivotally carried by the housing and when the closure element is in the closed position having at least portions of the stripper plate closely adjacent the seat and overlying adjacent portions of the closure extending outwardly of the seat, a spring yieldably biasing the carrier plate and closure toward the closed position thereof, and a float operably connected with the stripper plate and responsive to the level of liquid fuel in the tank to move the closure and the carrier plate to the open position thereof when the level of fuel in the tank is below a first predetermined level and to permit the closure and carrier plate to move to the closed position when the fuel in the tank is at a second level above the first level.

2. The apparatus as defined in claim 1 which also comprises a baffle carried by the housing and extending around the valve seat, closure and carrier plate to prevent liquid fuel from passing through the outlet passage and to the canister when the closure and carrier plate are in the open position.

3. The apparatus as defined in claim 2 wherein the baffle comprises a tube depending from the housing and the float is received in the tube.

4. The apparatus as defined in claim 1 in which said closure is a body of an elastomeric material having a durometer in the range of about 15 to 25 on the Shore A scale.

5. The apparatus of claim 1 wherein the valve seat has a non-circular configuration bounding an area which varies along different portions of the valve seat.

6. The apparatus of claim 5 wherein the area bounded by the valve seat varies from smaller at a point distal from the pivotal axis of the carrier plate to larger adjacent the pivotal axis of the carrier plate.

7. The apparatus of claim 6 wherein the valve seat has a generally T-shaped configuration.

8. The apparatus of claim 5 wherein the stripper plate also comprises at least two spaced apart pads each constructed to bear on a portion of the closure at a location immediately adjacent the seat and distal from the pivotal axis of the stripper plate to apply substantially to only an area of the closure adjacent the pads the force for initially opening at least a part of the closure adjacent the pads before opening a portion of the closure adjacent the pivotal axis of the stripper plate.

9. The apparatus as defined in claim 8 in which said closure is a body of an elastomeric material having a durometer in the range of about 20 to 70 on the Shore A scale.

10. The apparatus of claim 8 wherein a portion of the seat spaced from the pivotal axis of the stripper plate is axially elongated and extends generally perpendicular to the pivotal axis of the stripper plate.

11. The apparatus of claim 1 wherein the stripper plate also comprises at least one pad constructed to bear on the closure at a location immediately adjacent the seat and spaced from the pivotal axis of the stripper plate to apply a force to the closure for initially opening the valve.

12. The apparatus as defined in claim 1 which also comprises a tube depending from the housing, extending around the valve seat, closure, carrier plate and float, the lower end of the tube being disposed below the valve seat and communicating with the interior of the tank below the valve seat, and the float being slidably received in the tube and having a peripheral portion with a relatively close fit with the tube wall to prevent any substantial quantity of liquid fuel from passing beyond the float and into the valve seat when the closure is in an open position.

13. The apparatus as defined in claim 12 which also comprises a skirt carried by the housing and, in part, defining a vapor flow passage communicating with the valve opening when the closure is in an open position, and having an inlet communicating with the interior of the fuel tank which is generally vertically below the valve seat and above the lower end of the tube.

14. The apparatus as defined in claim 13 wherein a portion of the vapor flow passage between its inlet and the valve opening is disposed generally vertically above the valve seat.

15. The apparatus as defined in claim 13 wherein a portion of the vapor flow passage between its inlet and the valve opening is disposed generally vertically above the valve seat and immediately adjacent the top of the fuel tank on which the housing is received.

16. The apparatus as defined in claim 12 wherein the float has a conical recess therein tapering outwardly toward the top of the float and the float is connected to the stripper plate by a wire extending through the conical recess and connected with the float adjacent the bottom of the float.

17. The apparatus as defined in claim 12 which also comprises a vapor flow passage carried by the housing, communicating with the valve opening when the closure is in an open position and having an inlet communicating with the interior of the fuel tank at a location generally vertically below the valve seat and above the lower end of the tube.

18. The apparatus as defined in claim 1 wherein the float has a conical recess therein tapering outwardly toward the top of the float and the float is connected to the stripper plate by a wire extending through the conical recess and connected with the float adjacent the bottom of the float.

19. A vapor control apparatus for a vehicle fuel tank for containing volatile hydrocarbon liquid fuel which comprises: a housing constructed to be received on a fuel tank adjacent the top of the tank, an outlet passage carried by the housing for communicating with the exterior of the tank for supplying fuel vapor from the interior of the tank to the exterior of the tank, a valve assembly carried by the housing adjacent the top of the tank and movable to a closed position and to an open position to communicate with the outlet passage for supplying to the outlet passage fuel vapor from the interior of the tank, a float responsive to the level of liquid fuel in the tank to move the valve assembly to its open position when the level of fuel in the tank is below a first predetermined level and to permit the valve assembly to move to its closed position when the fuel level in the tank is at a second level above the first level, a depending tube carried by the housing, extending around the valve assembly and the float, open at its lower end, and adjacent its lower end communicating with the interior of the fuel tank, the float being insertable through the open lower end of the tube, slidably received in the tube and having a portion in the tube in close proximity with the tube to substantially prevent liquid fuel sloshing in the tank which enters the interior of the tube from passing beyond the float and through the valve assembly when it is in an open position, and a fuel vapor passage carried by the housing, communicating with the valve assembly to permit the flow of fuel vapor from the interior of the tank to the outlet passage when the valve assembly is open, and having an inlet communicating with the interior of the fuel tank at a position generally vertically above the lower end of the tube, whereby when the housing is received on a vehicle fuel tank in a normal operating position and liquid fuel sloshes in the tank substantially no liquid fuel enters the outlet passage when the valve assembly is open.

20. The apparatus as defined in claim 19 wherein the inlet of the vapor passage is also generally vertically above the valve assembly.

21. The apparatus as defined in claim 19 which also comprises a skirt carried by the housing and, in part, defines the vapor flow passage communicating with the valve opening when the closure is in an open position, and the inlet communicating with the interior of the fuel tank is generally vertically below the valve seat and above the lower end of the tube.

22. The apparatus as defined in claim 19 wherein a portion of the vapor flow passage between its inlet and the valve assembly is disposed generally vertically above the valve seat.

23. The apparatus as defined in claim 19 wherein a portion of the vapor flow passage between its inlet and the valve assembly is disposed generally vertically above the valve assembly and immediately adjacent the top of the fuel tank on which the housing is received.

24. The apparatus of claim 19 wherein the float is axially elongate and has a conical recess therein tapering outwardly toward the top of the float and the float is operably associated with the valve to open and close the valve by a wire extending through the conical recess and connected with the float adjacent the bottom of the float.

* * * * *